United States Patent [19]

Ozaki et al.

[11] 4,311,936

[45] Jan. 19, 1982

[54] BRUSH HOLDING DEVICE FOR ELECTRIC MOTOR

[75] Inventors: Sozaburo Ozaki; Isao Tonooka, both of Ibaraki, Japan

[73] Assignee: Hitachi, Ltd., Tokyo, Japan

[21] Appl. No.: 92,503

[22] Filed: Nov. 8, 1979

[30] Foreign Application Priority Data

Nov. 16, 1978 [JP] Japan ............................ 53-140421

[51] Int. Cl.³ ........................................... H02K 13/00
[52] U.S. Cl. ................................... 310/242; 310/245
[58] Field of Search ................ 310/239, 42, 241, 242, 310/245, 246, 247

[56] References Cited

U.S. PATENT DOCUMENTS

| | | | |
|---|---|---|---|
| 3,440,465 | 4/1969 | Pratt | 310/241 |
| 3,573,522 | 4/1971 | Pentland | 310/239 |
| 3,590,297 | 6/1971 | Smith | 310/239 |
| 3,735,172 | 5/1973 | Battaglia | 310/239 |
| 4,056,747 | 11/1977 | Carlson | 310/239 |
| 4,110,651 | 8/1978 | Fagan | 310/239 |
| 4,112,321 | 9/1978 | Wan | 310/242 |

FOREIGN PATENT DOCUMENTS 2340898  5/1974  Fed. Rep. of Germany ...... 310/239

*Primary Examiner*—R. Skudy
*Attorney, Agent, or Firm*—Craig and Antonelli

[57] ABSTRACT

A brush holding device for an electric motor of small size, with a brush cap being removably mounted to a brush holder so that a brush can be replaced. The brush cap is constructed such that a pair of elastic arms axially extend from the both sides of a coil retaining portion and a vertical wall is formed with a key hole for preventing the brush cap from radially slipping out of the brush holder.

5 Claims, 10 Drawing Figures

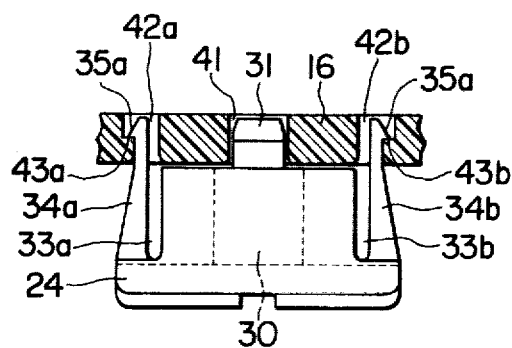
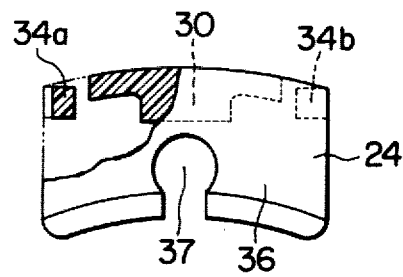
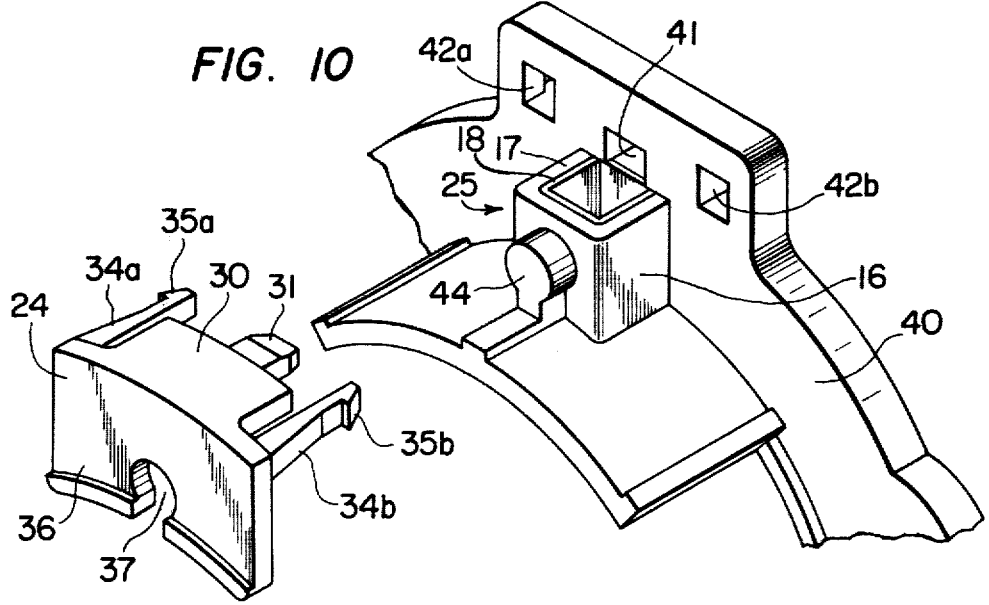

BRUSH HOLDING DEVICE FOR ELECTRIC MOTOR

BACKGROUND OF THE INVENTION

1. Field of the Invention

The present invention relates to a brush holding device for an electric motor, and more particularly to a brush holding device for a DC electric motor of small size.

2. Description of the Prior Art

An electric motor is generally divided into two types, i.e., one requiring replacement of brushes and the other requiring no replacement thereby to enjoy a relatively long life. In the brush replaceable type, since the brush replacement is not always performed by those having sufficient knowledge of the construction of the electric motor, it is required that the attachment and detachment of a brush cap be made as easily and surely as possible.

Generally speaking, the brush holding device for the electric motor includes a brush holder mounted to an outer frame, a brush fitted into the brush holder, a coil spring fitted in the brush holder for forcing a brush into contact with a commutator segment, and a brush cap mounted to the outer side of the brush holder for bearing the opposite end of the coil spring to the commutator segment. The electric motor of the brush replaceable type is constructed to have its brush cap removably mounted to the brush holder.

The brush-replaceable type brush holding device according to the prior art is disclosed in, for example, Japanese Utility Model Laid-Open Publication No. 53-123405, wherein the brush holder has, at an open end formed on an inner wall an annular land; whereas, the brush cap has, at a center on an upper side thereof a projection and, at a lower end an annular land. Thus, if the projection of the brush cap is forced into the open end of the brush holder, the land of the brush cap rides over the land of the brush holder so that the brush cap is snugly fitted snapped in the brush holder.

The brush holding device of this snap type has an advantage that the brush cap can be mounted on the brush holder by the single action. However, if the brush cap is to be removed from the brush holder, it is necessary to detach the projection of the brush cap from the opening of the brush holder by means of a suitable tool. As a result of this detachment procedure, the brush replacement is troublesome, and the projection of the brush cap may be broken by the tool.

SUMMARY OF THE INVENTION

It is therefore an object of the present invention to provide a brush holding device for an electric motor, in which the brush replacement can be performed with remarkable ease.

Another object of the present invention is to provide a brush holding device of the above type, in which the brush cap can be easily attached to and detached from the brush holder.

Still another object of the present invention is to provide a brush holding device of the above type, in which the brush cap can be removed from the brush holder without the use of any tool.

A further object of the present invention is to provide a brush holding device of the above type, which is equipped with such a brush cap as can hold the brushes without fail.

A further object of the present invention is to provide a brush holding device of the above type, in which the brush cap is prevented from axially and radially slipping outwardly out of the brush holder thereby to ensure holding of the brushes.

According to a major feature of the present invention, a brush holding device for an electric motor is provided wherein the brush cap is equipped with elastic arms adapted to be brought into removable engagement with the brush holder and with slip preventing means for preventing the brush cap from slipping radially outwardly out of the brush holder.

BRIEF DESCRIPTION OF THE DRAWINGS

FIG. 8 is a top plan view illustrating the brush-cap mounted on the brush holder;

FIG. 9 is also a partial cross sectional front elevational view of the brush cap in accordance with the present invention; and FIG. 10 is a perspective exploded view of the brush cap and the brush holder in accordance with the present invention.

DESCRIPTION OF THE PREFERRED EMBODIMENT

Figure 1:
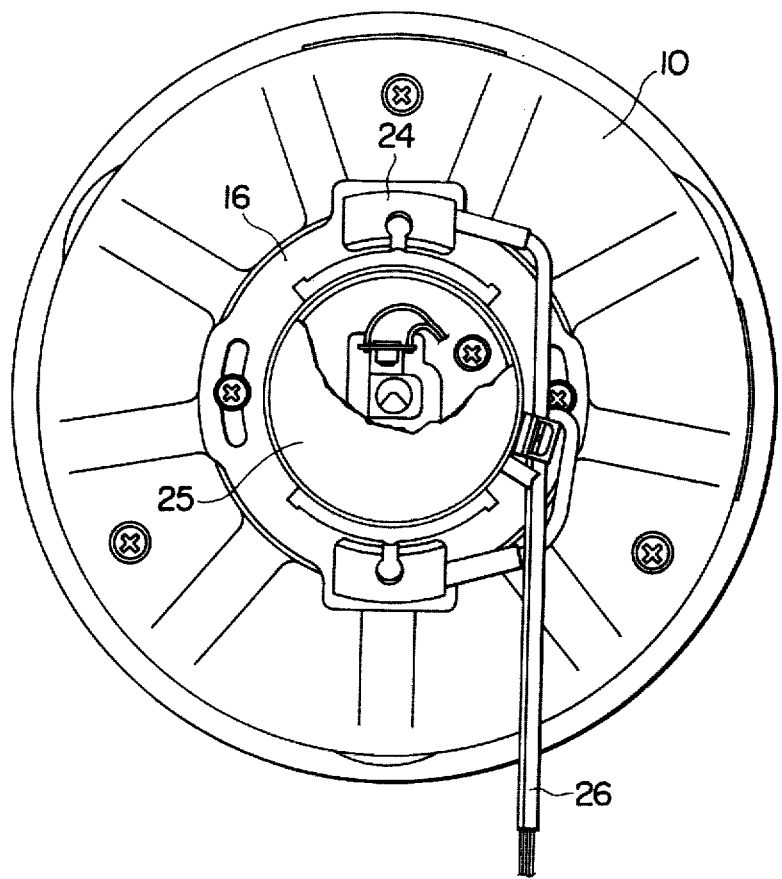
FIG. 1 is a front elevational view of a DC electric motor equipped with a brush holding device according to the present invention.
Figure 2:
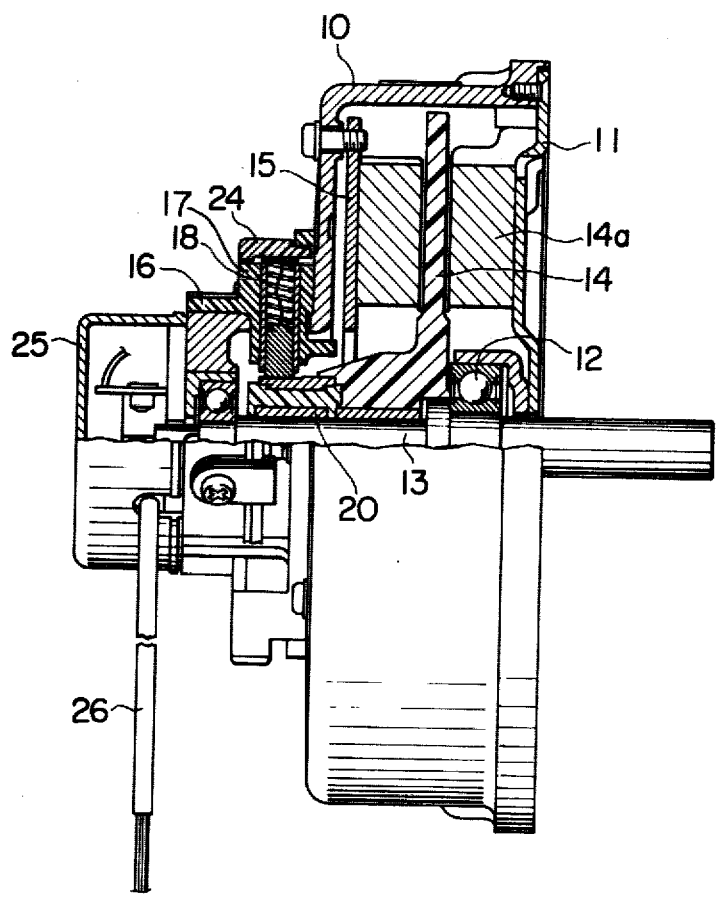
FIG. 2 is a partial cross sectional side elevational of the DC electric motor shown in FIG. 1.

FIGS. 1 and 2 provide an example of a brush holding device according to the present invention applied to a DC electric motor of a small size. The DC electric motor includes a housing 10 and an end bracket 11, with a motor shaft 13 being rotatably mounted therein by a ball bearing assembly 12. An armature 14, of a molded resin, and a yoke 15 are disposed in the housing 10 along with a fixedly mounted magnet 14a.

A brush holder 16, of a synthetic resin, is mounted to a front side of the housing 10. The brush holder 16 includes a holding cylinder 17 which receives a metal guide cylinder 18 which extends in a radial direction. A brush 19 and a coil spring 21 are fitted in the cylinder 18. As shown most clearly in FIG. 3, the spring 21 forces the brush 19 into contact with a commutator segment 20. More specifically, the brush 19 slightly protrudes from an inner end of the guide cylinder 18 while being in elastic contact with the commutator segment 20. A brush terminal 27 is positioned to abut against the outer end of the guide cylinder 18 and is electrically connected with the brush 19 through a pigtail 22. The commutator segment 20 is electrically connected with the winding of the armature 14 through a lead wire 23. A brush 19 is removably mounted in the brush holder 16.

Reverting to FIG. 2, a protective cover 25 is mounted on a front side of the brush holder 16 for protecting a speed meter (not shown). A lead wire 26 extends out of the protective cover 25.

Figure 3:
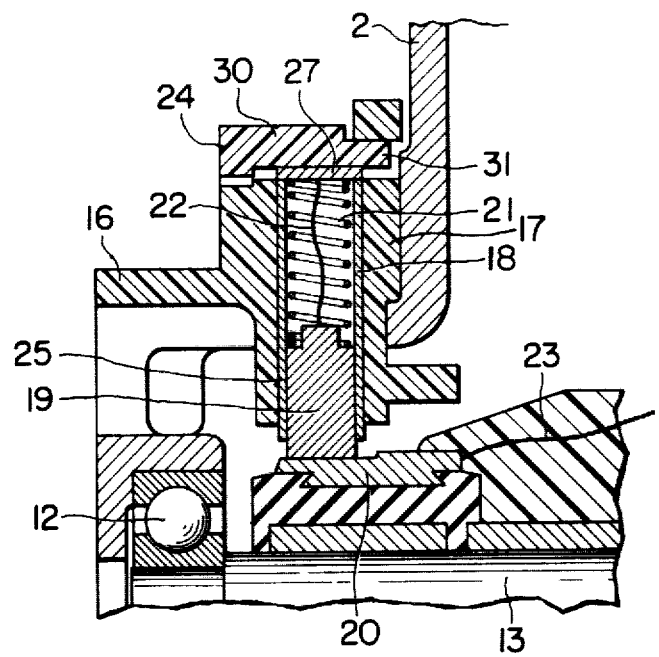
FIG. 3 is an enlarged cross sectional detail view of the DC electric motor of FIG. 2 in an area of the brush holding device.
Figure 4:
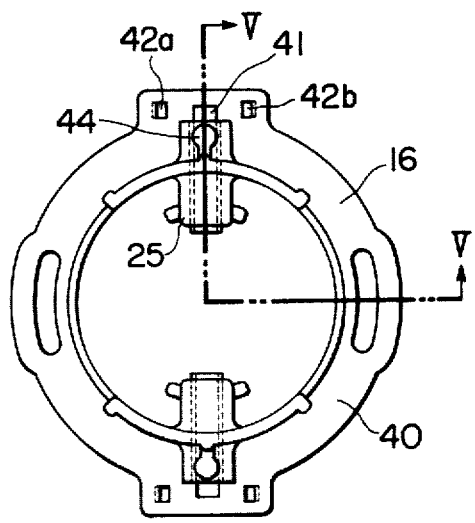
FIG. 4 is a front elevational view of a brush holder in accordance with the present invention.
Figure 5:
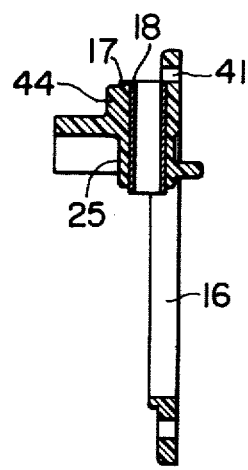
FIG. 5 is a cross-sectional view taken along the line V—V of FIG. 4.
Figure 6:
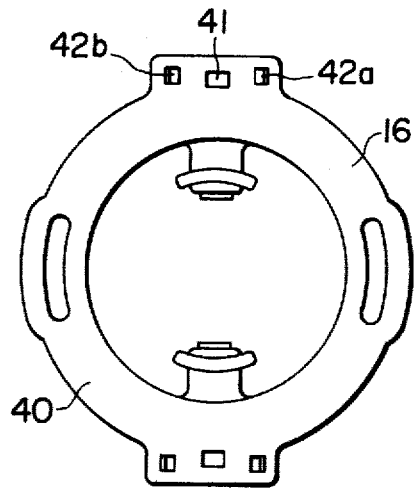
FIG. 6 is a rear elevational view of the brush holder of FIG. 4.

Turning to FIG. 3, a brush cap 24, molded of a synthetic resin and has an L-shaped cross-sectional side. The brush cap 24 is axially extended to form a flattened coil retaining portion 30 which bears the opposite end of the coil spring 21 to the commutator segment 20. The coil retaining portion 30 has an axially extended center portion forming an axial projection 31. More specifically, the projection 31 is extended integrally from a lower step 32 of the coil retaining portion 30 to thereby bear the coil spring 21. The leading end of the projection 31 has its upper side and both sides chamfered to form a slightly thinned tip, as better seen from FIGS. 7 and 10.

Moreover, the coil retaining portion 30 of the brush cap 24 has a pair of arms 34a and 34b formed at respective sides thereof. The arms 34a, 34b extend in the axial direction across the coil retaining portion 30 with a pair of slots 33a and 33b being interposed between the respective arms 34a, 34b and the coil retaining portion 30. The arms 34a and 34b are made to have such elasticity as can be slightly warped inwardly toward the coil retaining portion 30. The arms 34a and 34b are converged toward their leading ends, which are formed with retaining hooks 35a and 35b protruding outwardly in a direction facing away from each other. The length of the arms 34a and 34b is made such that their leading ends are in line with the projection 31 of the coil retaining portion 30.

As best shown in FIG. 10, still, the brush cap 24 is formed with an integral vertical wall 36 which is radially extended from the base end of the coil retaining portion 30. The vertical wall 36 is formed with a key hole 37 which is cut away from the lower center thereof.

Turning to FIGS. 4 to 8 and 10, the construction of a brush holder 16 will be described. The brush holder 16 has a flange 40 formed with a receiving hole 41 for receiving the projection 31 of the brush cap 24, and a pair of retaining holes 42a and 42b which are formed at the both sides of the receiving hole 41 for receiving the leading ends of the arms 34a and 34b. As better shown in FIGS. 7 and 8, inner walls of the retaining holes 42a, 42b are formed with snap steps 43a and 43b, on which the retaining hooks 35a and 35b of the arms 34a and 34b are retained.

As shown in FIG. 10, an outer side of the holding cylinder 17, which protrudes from the portion of the brush holder 16 below the receiving hole 41, is formed with a key 44 of generally cylindrical shape, which is to be fitted in the key hole 37 of the brush cap 24.

Figure 7:
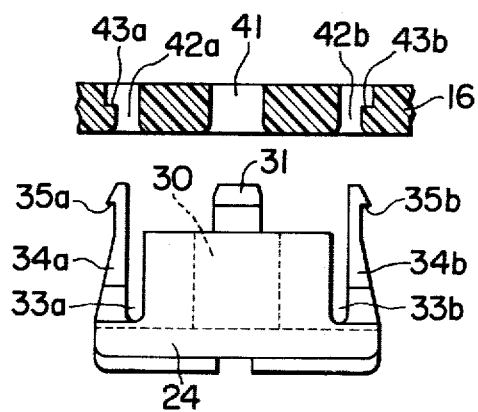
FIG. 7 is a top plan view illustrating the conditions before the brush cap is mounted on the brush holder in accordance with the present invention.

With close reference to FIGS. 7 and 10, when it is intended to mount the brush cap 24 to the brush holder 16, the arms 34a and 34b and the projection 31 of the brush cap 24 are placed to face the receiving holes 42a and 42 and the receiving hole 41 of the brush holder 16, respectively, whereas the key hole 37 of the brush cap 24 is placed to face the key 44 of the brush holder. Then, the leading end of the projection 31 and the leading ends of the ams 34a and 34b are inserted into the receiving hole 41 and the retaining holes 42a and 42b, respectively, and the key hole 37 is fitted on the key 44, while holding the coil spring 21 in the guide cylinder 18 by means of the coil retaining portion 30 of the brush cap 24. After that, the brush cap 24 is pushed to the flange 40 in the axial direction of the electric motor. Until the brush cap 24 reaches a preset position, the receiving hole 41 acts as a guide for the projection 31 whereas the key 44 acts as a guide for the key hole 37. During that press fitting operation of the brush cap 24, the leading ends of the arms 34a and 34b slide on the inner walls of the retaining holes 42a and 42b while being slightly warped inwardly to each other. When the retaining hooks 35a and 35b ride over the snap steps 43a and 43b, the arms 34a and 34b are allowed to restore their original conditions until the retaining hooks 35a and 35b engage snugly with the snap steps 43a and 43b, thus finishing the mounting operation of the brush cap 24, as shown in FIG. 8.

Under this condition, even if the brush cap 24 is pushed radially outwardly of the electric motor by the action of the coil spring 21, it can be prevented from slipping radially out of the brush holder 16. This is partly because the key hole 37 is retained by the key 44 and partly because the projection 31 is retained by the receiving hole 41. Moreover, even if, the brush cap 24 is pulled in the opposite direction to the fitting direction apart from the brush holder 16, it can be prevented from slipping out of the latter by the retaining actions between the retaining hooks 35 and 35b and the snap steps 43a and 43b.

Next, the operations, by which the brush cap 24 is removed from the brush holder 16, will be described. First of all, the arms 34a and 34b are pinched at their outer sides with the two fingers of an operator so that their leading ends are pushed inwardly toward each other to release the retaining engagements between the retaining hooks 35a and 35b and the snap steps 43a and 43b. If the brush cap 24 is then pulled axially outwardly, it can be easily removed from the brush holder 16. Then, the brush cap 24 is removed, and the worn brush 19 is replaced by a new one. After that, the brush cap 24 is mounted in the manner described hereinabove. Thus, the renewal of the brush 19 is finished.

As described hereinabove, according to the present invention, since the retaining hooks 35a and 35b of the arms 34a and 34b, which are formed at the upper portions of the brush cap 24, are retained on the snap steps 43a and 43b of the retaining holes 42a and 42b of the brush holder 16, the brush cap 24 can be prevented from axially slipping out.

Moreover, since the key hole 37 of the vertical wall 36 of the brush cap 24 is fitted on the key 44 of the brush holder 16, the brush cap 24 can be prevented from radially slipping out. Furthermore, since the projection of the coil retaining portion 30 of the brush cap 24 is fitted in the receiving hole 41 of the brush holder 16, the brush cap 24 can also be prevented from radially slipping out.

According to the embodiment thus far described, since the brush cap 24 and the brush holder 16 are provided with means for preventing the former from slipping out in both the axial and radial directions, this slip preventing action of the brush cap 24 can be stabilized.

According to the aforementioned construction of the present invention, the mounting operation of the brush cap 24 on the brush holder 16 can be finished by the single action of merely forcing the former into the latter. On the contrary, the demounting operation of the brush cap 24 can be performed by merely pinching and pulling the arms 34a, 34b at their outer sides easily and promptly without the use of any tool. Moreover, since the arms 34a, 34b at the both sides are retained in the brush holder 16, the brush cap 24 can be prevented from shaking while they are being inserted. Furthermore, since the brush cap 24 is prevented from axially and radially slipping out, the holding and retaining functions of the brush 19 can be ensured.

What is claimed is:

1. A brush holding device the brush holding device comprising:
    a brush holder having a flange mounted to a housing of the electric motor;
    a brush received in said brush holder;
    a coil spring received in said brush holder for forcing said brush into contact with a commutator segment;
    a brush cap removable attached to an outer side of said brush holder, the brush cap including a coil retaining portion for bearing an end of said coil spring disposed opposite to said commutator segment, a a pair of elastic arms extending from respective side of the coil retaining portion, and a vertical wall radially extending from a base end of said coil retaining portion, each of said pair of arms are formed at leading ends thereof with means for engaging the flange of the brush holder; and
    means for preventing said brush cap from radially slipping out of said brush holder including a key hole formed in the vertical wall of said brush cap and a key formed on a holding cylinder of said brush holder on a side thereof facing the vertical wall of said brush cap, said key being adapted to cooperate with the key hole formed in the vertical wall of said brush cap;
    whereby the brush cap is axially forced into the brush holder until the leading ends of the arms of the brush cap are elastically retained by the brush holder so as to enable a mounting of the brush cap to the brush holder, with the arms of the brush cap being pinched inwardly toward each other to release the engaging means of the arm so as to enable the brush cap to be axially removed from the brush holder.

2. A brush holding device according to claim 1, wherein said engaging means are formed as retaining hooks, and wherein snap step means are provided in the flange of the brush holder for receiving said arms and preventing the retaining hooks from axially slipping out.

3. A brush holding device the brush holding device comprising:
    a brush holder having a flange mounted to a housing of the electric motor;
    a brush received in said brush holder;
    a coil spring received in said brush holder for forcing said brush into contact with a commutator segment;
    a brush cap removably attached to an outer side of said brush holder, the brush cap including a coil retaining portion for bearing an end of said coil spring disposed opposite to said commutator segment, a pair of elastic arms extending from respective sides of said coil retaining portion, a vertical wall radially extending from a base end of said coil retaining portion, means for preventing said brush cap from radially slipping out of said brush holder, and a projection formed at a leading end of the coil retaining portion and extending in a same direction as said arms, each of said pair of arms are formed at leading ends thereof with means for engaging the flange of the brush holder;
    means are provided at a portion of the brush holder facing the vertical wall of the brush cap for preventing said brush cap from radially slipping out of the brush holder; and a receiving hole is formed in a portion of the brush holder for receiving said projection and preventing the projection from radially slipping out;
    whereby the brush cap is axially forced into the brush holder until the leading ends of the arms of the brush cap are elastically retained by the brush holder so as to enable a mounting of the brush cap to the brush holder, with the arms of the brush cap being pinched inwardly toward each other to release the engaging means of the arm so as to enable the brush cap to be axially removed from the brush holder.

4. A brush holding device for an electric motor, the brush holding device comprising:
    a brush holder including a flange mounted to a housing of the electric motor, the brush holder includes a pair of retaining holes formed with snap steps, and a holding cylinder extending from said flange, said holding cylinder being formed with a key;
    a brush replaceably received in said brush holder;
    a coil spring means disposed in said brush holder for forcing said brush into contact with a commutator segment; and
    a brush cap removably attached to an outer side of said brush holder, the brush cap including a coil retaining portion for bearing an end of said coil spring disposed opposite to said commutator segment, a pair of elastic arms extending in parallel from respective sides of said coil retaining portion, and a vertical wall radially extending from a base end of said coil retaining portion, the radially extending wall includes a key hole adapted to be fitted on the key of the holding cylinder of said brush holder, each of said pair of elastic arms are formed at leading ends thereof with retaining hooks engageable with the snap steps of the retaining holes of the flange of said brush holder;
    whereby the key hole of the brush cap is axially fitted on the key of the brush holder until the retaining hooks of the arms of the brush cap are elastically retained by the snap steps of the retaining holes of the brush holder so as to enable a mounting of the brush cap to the brush holder, with the arms of the brush cap being adapted to be pinched inwardly toward each other so as to release the retaining engagement of the retaining hooks with the snap steps of said brush holder thereby enabling the key hole of the brush cap to be axially pulled from the key of said brush holder so that the brush cap may be removed from the brush holder.

5. A brush holder according to one of claims 1 or 4, characterized in that the holding cylinder extends radially and a metallic guide cylinder is disposed in the holding cylinder for accommodating the coil spring and the brush, and a brush terminal is interposed between the brush cap and a radially outer end of the guide cylinder.

* * * * *